United States Patent [19]
Johnson, Jr. et al.

[11] Patent Number: 6,072,780
[45] Date of Patent: *Jun. 6, 2000

[54] DIAL UP TELEPHONE CONFERENCING SYSTEM CONTROLLED BY AN ONLINE COMPUTER NETWORK

[75] Inventors: Clark E. Johnson, Jr., Minneapolis, Minn.; Richard J. Solomon, Monson, Mass.; Tice F. DeYoung, Fairfax, Va.; David J. Farber, Landenberg, Pa.

[73] Assignee: Caritas Technologies, Inc., Minneapolis, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 09/212,786

[22] Filed: Dec. 16, 1998

Related U.S. Application Data

[63] Continuation-in-part of application No. 08/918,564, Aug. 22, 1997, abandoned.

[60] Provisional application No. 60/024,592, Aug. 26, 1996.

[51] Int. Cl.[7] .............................. H04L 12/16; H04Q 5/14
[52] U.S. Cl. ............................................. 370/260; 379/202
[58] Field of Search ...................................... 370/259, 260, 370/261, 262–271, 410; 379/201, 202–206, 209, 210, 67, 88, 89, 196; 348/14, 15, 16; 455/414, 416

[56] References Cited

U.S. PATENT DOCUMENTS

| | | | |
|---|---|---|---|
| 5,559,875 | 9/1996 | Bieselin et al. | 370/202 |
| 5,619,555 | 4/1997 | Fenton et al. | 370/202 |
| 5,661,790 | 8/1997 | Hsu | 379/209 |
| 5,765,108 | 6/1998 | Martin et al. | 455/422 |
| 5,818,836 | 10/1998 | Duval | 370/389 |
| 5,852,656 | 12/1998 | Sato et al. | 379/93.21 |
| 5,884,032 | 3/1999 | Bateman et al. | 395/200.34 |

*Primary Examiner*—Ajit Patel
*Attorney, Agent, or Firm*—Daniel Robbins

[57] ABSTRACT

In a telephone conferencing system, a digital communication network is used to establish and control the telephone connections between multiple conferees with the telephone network being the means of exchanging verbal information. Each conferee may have a computer connected to the digital network, and each has an independent telephone instrument connected to the public switched telephone network. An in-charge conferee utilizes his computer containing appropriate software to initiate the conference and to control the participation of the conferees. The in-charge conferee sends digital control signals to a switch interface controlling a telephone switch as a gateway to the telephone network. These control signals include the commands by which the conferee telephones are rung up, brought on line, or dropped from the conference. The switch provides telephone status information back over the digital network, and the in-charge conferee, as well as other conferees if provided with appropriate software, display this status information on their PC monitors.

25 Claims, 3 Drawing Sheets

DIAL UP TELEPHONE CONFERENCING SYSTEM CONTROLLED BY AN ONLINE COMPUTER NETWORK

This application claims the benefit of U.S. Provisional application Ser. No. 60/024,592, filed Aug. 26, 1996. This application is a continuation-in-part of U.S. application Ser. No. 08/918,564 filed Aug. 22, 1997 now abandoned.

BACKGROUND OF THE INVENTION

1. Field of the Invention

This invention relates to telephone conferencing, and in particular to dial up telephone conferencing utilizing computer control.

2. Description Relative to the Prior Art

In the art, it is known that telephone conferences may be implemented through "conferencing centers" provided as a service by local and long distance telephone companies. A list of telephone numbers of the conferees and the date and time at which the conference is to begin is supplied to a conference center operator who performs the dialing operations to bring the conferees simultaneously on line to initiate the conference. This technique is limited by the necessity of setting up a relatively inflexible forum in which all participants must be designated in advance, and the inclusion and reliance upon outside telephone company personnel to implement the conference.

A more recent form of conferencing utilizes digital networks such as the Internet that are publicly accessible by individual computers (typically PCs) via Internet Relay Chat (IRC) hosts. The conferees come on line and are interconnected by means of the host, and may utilize software which allows fully duplexed communication between the PCs. Typically, the conference is conducted with the exchanged information visually appearing on the individual PC display screens. In more sophisticated applications allowing audio communication between the conferees, additional hardware is required at each PC site. A microphone and analog to digital converter provide digitized audio input to a PC by means of appropriate software, such as commercially available VocalTec software, and the audio output is derived from the digital information transmitted over the Internet by use of a digital to analog converter feeding a speaker. Encryption software may be employed to "scramble" the digital information transmitted via the network, but all potential conferees must be provided with this software, and must be alerted to the fact that it is being used. Hence, a conference of multiple conferees requires additional hardware and software at each PC site in order to implement a conference by means of the Internet.

SUMMARY OF THE INVENTION

Rather than utilize the telephone network alone or data network alone to carry out a multiple participant audio teleconference as disclosed in the prior art, the present invention teaches the dynamic use of either or both a telephone network and the Internet communication network as a means to establish and control the telephone connections between the multiple conferees, with the telephone network being the normal means of exchanging audio information but allowing the use of either or both a telephone network and the Internet communications network in certain cases.

Each conferee may have an independent PC connected to the Internet network, and an independent telephone instrument connected to the public switched telephone network. The conferee nominally in charge of the conference, who is designated the "Conference Meister", utilizes his PC containing appropriate software, to initiate the conference and to control the participation of the conferees. Via the Internet, the Conference Meister sends digital control signals to a switch interface controlling a telephone switch as a gateway to the telephone network. These control signals include the numbers of the preselected conferee telephones (including that of the Conference Meister), and the order in which the conferees are to be rung up and brought on line. The Conference Meister has broad supervisory control over the conference, dropping or adding parties to the conference by communication with the switching interface and telephone switcher, and having a display at his PC of the telephone connections status. It will be noted that conferees, with the exception of the Conference Meister, may participate in the telephonic conference without having a PC, although having a PC allows the on-line PC participant receipt of additional information via the Internet connection, such as graphics or status information from the Conference Meister.

BRIEF DESCRIPTION OF THE DRAWING

The invention will be described with respect to the drawings of which.

DESCRIPTION OF THE PREFERRED EMBODIMENT

Figure 1:
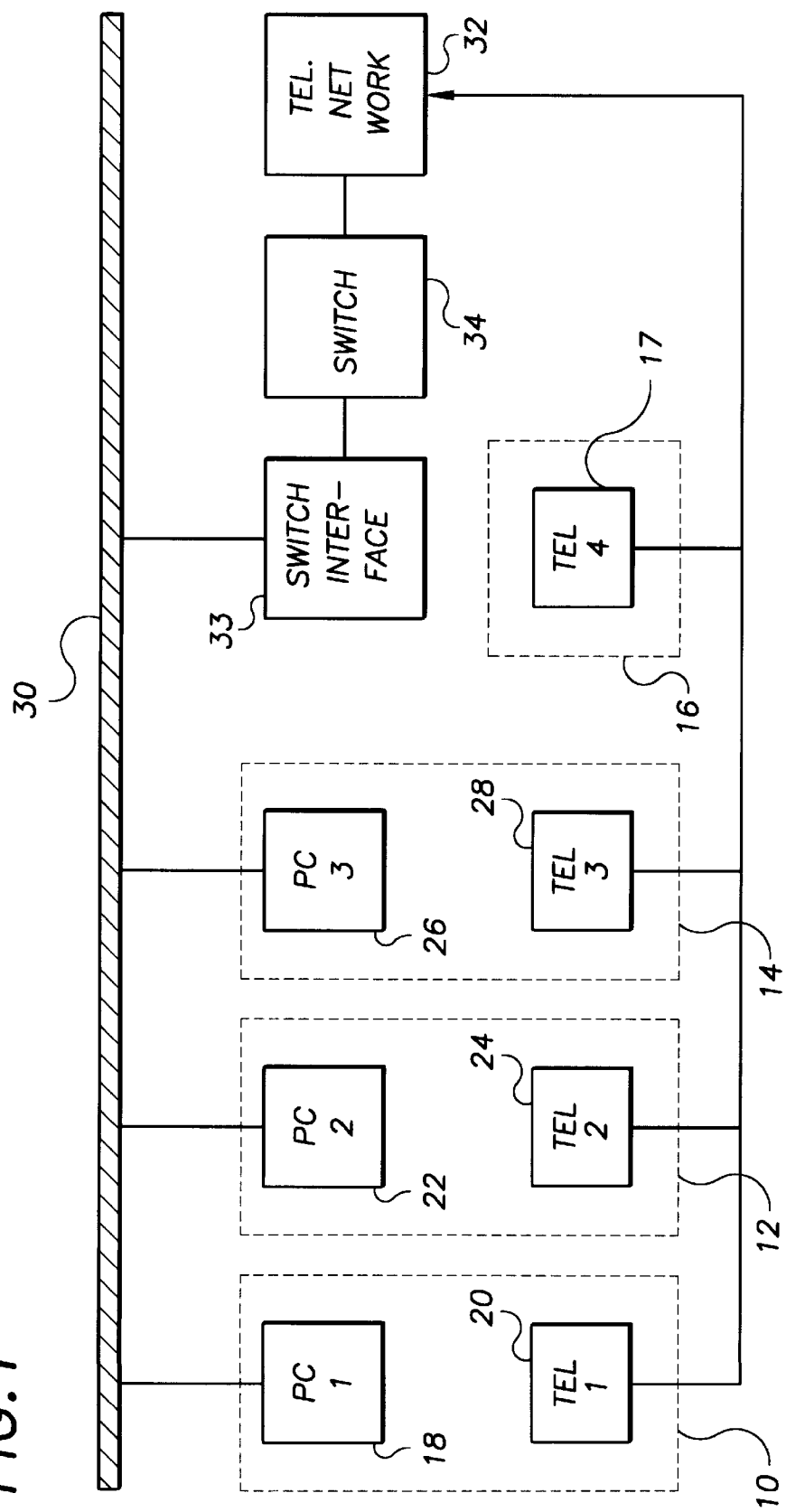
FIG. 1 is a block diagram of one embodiment of the invention.

Referring to the figure, a conferee station 10 consists of a PC computer 18 and a telephone 20. Conferee stations 12,14, correspondingly have PC computers 22, 26 and telephones 24,28. Other conferee stations, i.e. 16 may still be connected into the conference network without the requirement of a computer; the conferee station 16 comprising only the telephone 17. All the PCs are connected to the Internet network 30 using standard Transmission Control Protocol/Internet Protocol (TCP/IP) connect software. The telephones 20, 24,28,17 are tied into the telephone network 32 in a conventional manner. It will be noted that the telephones 20, 24,28,17 are independent of the Internet network 30. A switch interface 33 controlling a telephone switch 34 is also connected so as to receive control signals via the Internet 30 and to transmit them to the telephone network 32, as will be described below.

Anyone of the conferee stations 10, 12, 14, possessing a PC, may be designated as Conference Meister. For convenience of explanation, it is assumed that conferee station 14 is designated as Conference Meister. To implement this designation, PC 26 of conferee station 14 is provided with additional software which allows PC 26 to communicate with the switch interface 33 both to control the telephone switch 34 and to receive status information from the telephone switch 34, via the Internet 30.

The Conference Meister station 14 and the switch interface 33 communicate over the TCP/IP transport layer of the Internet 30 using the Internet's User Datagram Protocol (UDP) with checksum. A common fixed-length interprocess message called the Conference Protocol Data Unit (CDPU), using the software format further described below in Table I, is exchanged between the Conference Meister 14 and the switch interface 33, in the data field of a UDP-Datagram. The switch interface 33 converts the CDPU into Signalling System 7 (SS7) commands which act on the switch 34, and attendantly, on the telephone network 32 to control the conferees telephones 20, 24, 28,17. SS7 is an internationally recognized telephony standard of 255 commands for controlling telephone calls via switch 34 using standard lookup table procedures. The switch interface 33 interacting with the switch 34 may be implemented incorporating a standard microcomputer such as a Motorola 68705P5 performing the table lookup translation of SS7 commands into CPDU commands stored in its ROM memory. It will be noted that the switch interface 33 is bi-directional, and telephone connection status information as established by the switch 34, i.e. ringing, off-hook, on-hook busy, for all participants is transmitted back via the Internet to the Conference Meister for icon display on his PC.

All fields in the CPDU are ASCII character fields. The CPDU consists of 32 bytes of data as follows:

| Session ID / | Conference ID / | Command/Response Code / | Data / |
|---|---|---|---|
| 4 bytes | 2 bytes | 2 bytes | 24 bytes |

The Session ID and Conference ID fields contain administrative "housekeeping" information. The Command/Response Code field indicates the message type and the message meaning. Parameters of the Data Field are fixed length subfields and depend upon the message type. Detailed descriptions of the Command/Response Code field are shown below in Table I.

TABLE I

| Code | Command | Response | Meaning |
|---|---|---|---|
| HE | ✓ | | HELLO. Conference Meister's Request for Session-Id |
| LO | | ✓ | LOGON. The Switch Interface's response to a Conference Meister's HE (Hello) assigning him his temporary Session-Id, and signaling him to logon. |
| LO | ✓ | | LOGON. A Conference Meister's logon. information giving user id, password, and account number in the data field. |
| RS | | ✓ | RESOURCES. The Switch Interface's acceptance of a Conference Meister's LO (Logon) |
| EC | ✓ | | ESTABLISH CONNECTION. A Conference Meister's request that a specified telephone number be connected to a conference. |
| SU | | ✓ | SUCCESS. The Switch Interface's response to an EC (Establish Connection) request. If successfully completed. It returns a connection-id used to refer to this members conference connection. |
| FA | | ✓ | FAIL. The reply sent when LO (Logon) or EC (Establish Connection) fails. Failure details are carried in the data field. |
| DC | ✓ | | DISCONNECT. A request from the Conference Meister to disconnect a conference members connection, or to terminate a conference |

TABLE I-continued

| Code | Command | Response | Meaning |
|---|---|---|---|
| | | | (disconnect all member connections on the conference). |
| DC | | ✓ | DISCONNECT. An unsolicited response from the Switch Interface notifying the Conference Meister that a conference members connection has been disconnected. |
| ST | ✓ | | STATUS. This command is the Conference Meister's means of maintaining and reconstructing its conference information in the face of dropped connections and unreliable datagram transmissions. |
| ST | | ✓ | STATUS. The Switch Interface's reply to a Conference Meister's status request. |
| ER | | ✓ | ERROR. This is the reply used to signal invalid message parameters, such as Session-Id. |
| IH | ✓ | ✓ | I'M HERE. This message confirms that Conference Meister and Switch Interface are still in contact during intervals when there is no command/response traffic between them. |

In the above description of the invention, the Conference Meister 14 initiates the conference. By providing CDPU software to the other conferees, the invention allows any other one of the conferee stations, i.e. 10,12, to serve as a Conference Meister. The invention has been described in detail with particular reference to preferred embodiments thereof, but it will be understood that variations and modifications can be effected within the spirit and scope of the invention. For example, other data networks, such as a private intranet rather than the Internet, may be used for digital data communication among the conferee PCs, as well as other telephone signalling systems.

In a second embodiment of the invention, the system of FIG. 1 may be further configured to provide an inherent call-back capability. Though it uses the same conferencing software described above, call-back can be between just two parties. Essentially each PC station is set up so it can serve as a "conference meister"; no other special software or hardware need be installed on a station's PC. Only the initiating station requires a PC or other access to the Internet. A suitably programmed touchtone phone can be used to access the Internet without the use of a computer such as the PC. The two party call-back feature sets up the call via the Internet with the conversation taking place on the normal telephone system in a manner substantially the same as that described above for conferencing.

Figure 2:
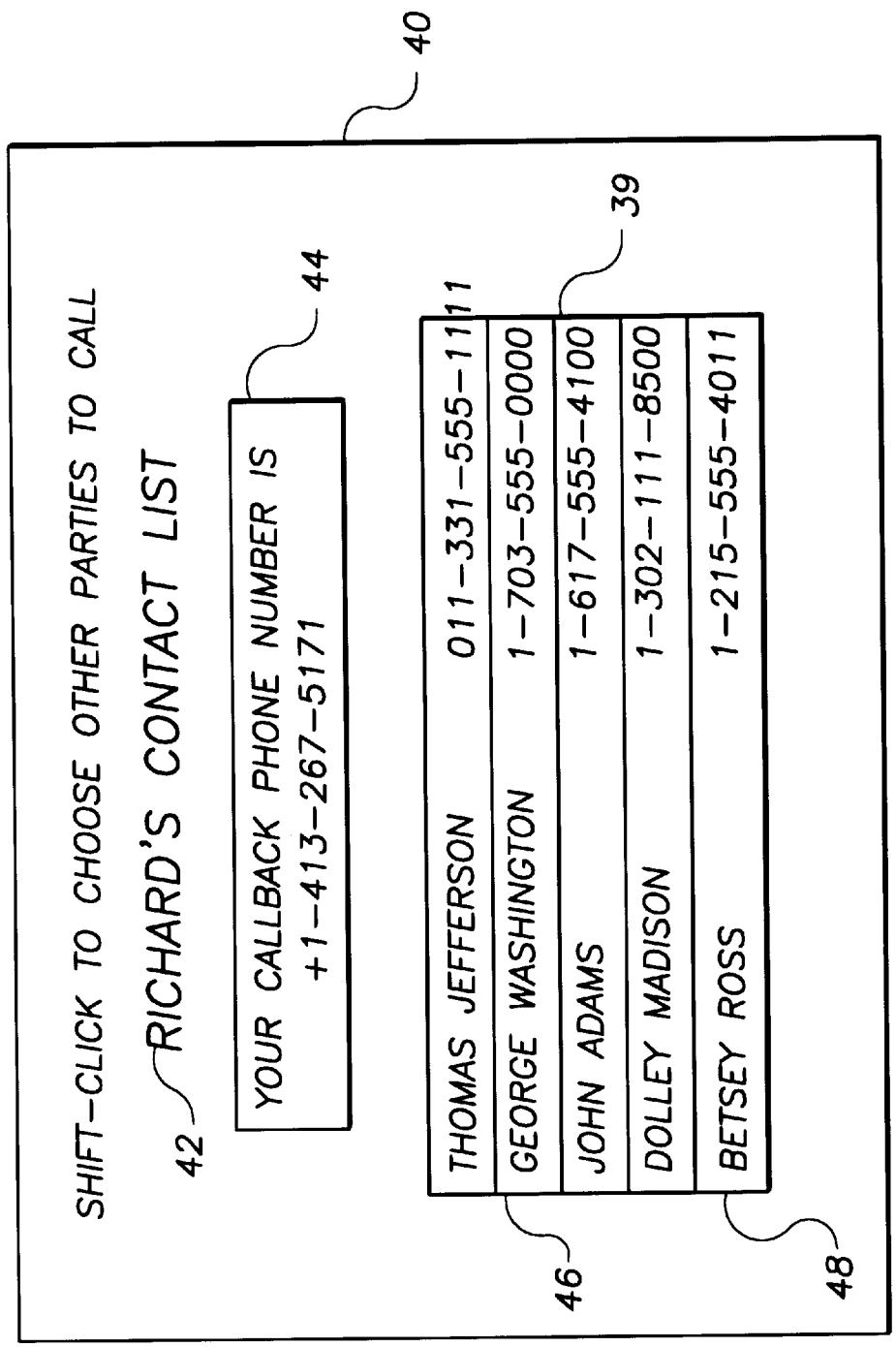
FIG. 2 is a drawing of a display of information in a second embodiment of the invention.

Referring to FIG. 2, a participating PC call-back station shows a display chart 40 on its monitor. The display chart 40 contains the station identification 42 (e.g. Richard) and a contact list 39, and the PC station's call-back telephone number 44. The contacts are shown with their complete dial-up telephone numbers, e.g. 46, 48, and by clicking on one or more or more of the displayed contacts, calls are dialed to the selected parties via the Internet and the switch 34 of FIG. 1, as previously described for conference calling. It will be appreciated that single parties can be selected to allow two person telephone conversation utilizing the convenience of simplified "point and click" dialing via the stored telephone numbers shown on the PC monitor screen. In the two party call-back connection system described above, it is not necessary to have two telephone lines at a PC station, i.e. one for connection to the Internet and one for carrying the telephonic conversation. With a single telephone line, the system software may be set to instantly disconnect the Internet connection after the called party's number is transmitted by the PC to the switch 34, and to ring the call initiator's telephone simultaneously. In this manner, the calling party and the called party are connected by means of a single telephone line in seconds.

Anonymity of the caller is preserved by the invention even when the calling party has automatic numbering identification (ANI) or "Caller ID". Since the system makes all its connections to the called party via the call-back technique from the remote switch 34 under control of the "conference meister" software, the only records of all the connected telephone numbers are recorded at the switch 34, including the number of the calling party. This occurs because the caller or "conference meister" is also one of the call-back numbers. Each connection is shown as a separate call on the inter-office telephone control (SS7) software originating from the switch 34, not from a calling party's telephone. The switch 34 can have an anonymous telephone number assigned as the originating number. Alternately, the calling party can designate some other listed number for ANI sending or Caller ID purposes which would key the called party as to who is calling.

With the anonymous option, no traceable record of a call is available locally. This minimizes industrial espionage at hotels, customer offices, and even private homes where merely the fact that certain parties made a call could be valuable information. The proper legal authorities can always get the full records from the central switch 34 if need be to document who initiated the call, and which telephones were called.

Figure 3:
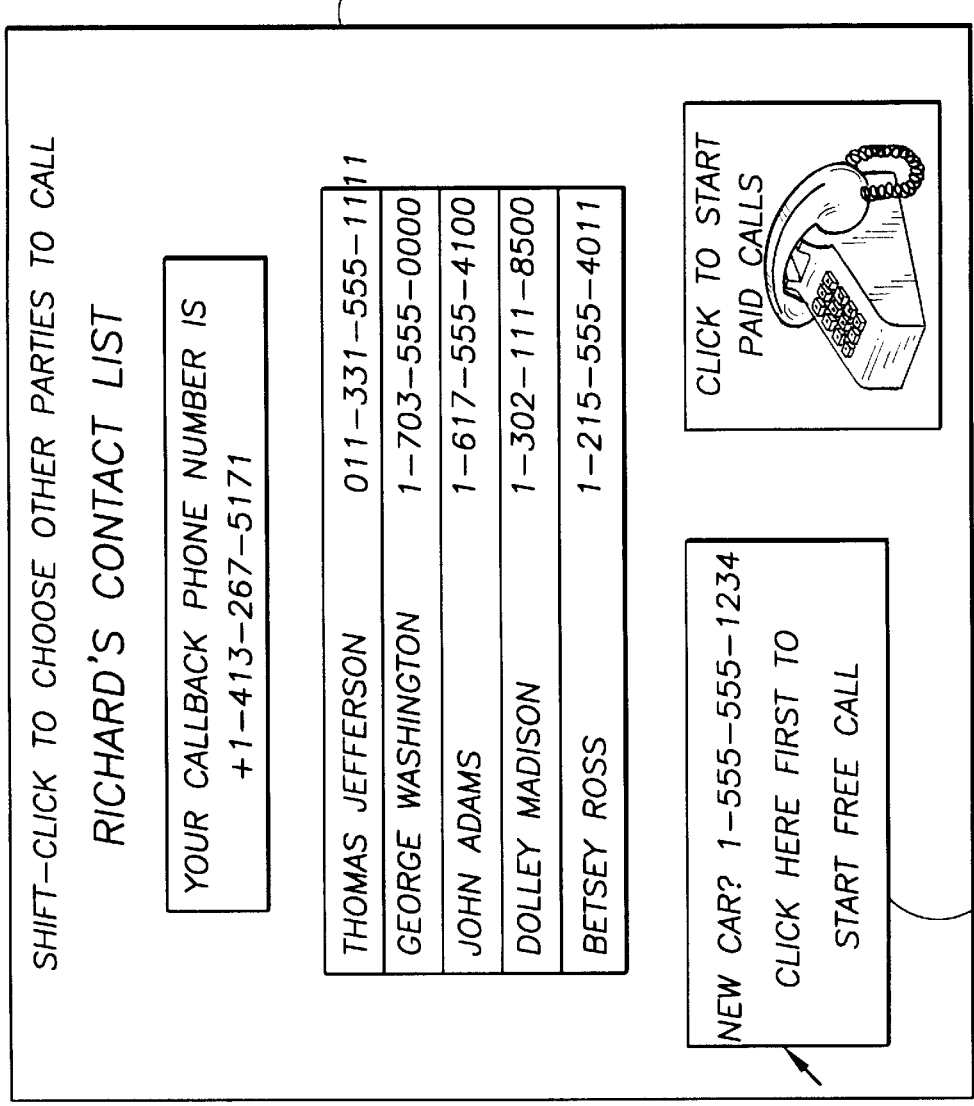
FIG. 3 is a drawing of another display of information in a third embodiment of the invention.

In a third embodiment, the call-back system can be expanded to include an advertising feature. Referring to FIG. 3, a display 40' is expanded to include an advertising block 50. Under this embodiment, in order to place a call via the call-back system or activate a conference, the program requires clicking on the advertising block 50 by the caller to create a record that the advertisement was seen by the caller. Various subroutines can then be activated such as requiring additional periodic clicks on the advertisement to keep the call connected, or linking the caller to a web page of the advertiser providing additional information as to the users of the system.

It will be noted that the displays 40, 40' are to be implemented in various colors, and that the selection by clicking on any portion of the display will be highlighted in a manner known in the computer art.

What is claimed is:

1. A system for communication among a a first plurality of conferee stations, said system connectible to the Internet network, said conferee stations including communication apparatus having dial up capability, said system further comprising:

a) a dial up communication network providing Common Channel Signalling SS7 compatible telephonic communication interconnections among said conferee stations, b) a second plurality of said conferee stations further comprising digital computer apparatus for receiving and transmitting digital signals over said Internet network, said second plurality equal to or less than said first plurality, and c) a SS7 compatible digitally controlled switch module comprising a switch interface and a switch capable of receipt of telephonic command signals and capable of transmitting telephonic reply control signals, said module having an input and an output, said module connected to said Internet network for receiving and transmitting said digital signals over said Internet network, said switch output connected to said dial up communication network wherein said output of said switch is responsive to digital signals from said digital computer apparatus applied to said switch module input for effecting communication among said stations, whereby said digital computer apparatus contains a stored computer program providing distributed computer supervisory control of said telephonic communication interconnections.

2. The system of claim 1 wherein said digital computer apparatus is a PC compatible computer.

3. The system of claim 1 further including commands and responses for interchanging information between said digital computer apparatus and said switch module whereby said digital computer apparatus displays ringing, off hook, on hook busy and dropped connection status of said conferee stations.

4. The system of claim 3 further comprising signals from said digital computer apparatus to provide instructions to said switch module wherein the parameters defining participation of said conferees is modified.

5. The system of claim 1 wherein preassigned Internet network digital signals are converted to Signalling System 7 command signals by a microcomputer.

6. A method of establishing telephonic conferencing among a first plurality of conferees comprising the steps of:

a) connecting a second plurality of digital computers to the Internet, said second plurality equal to or less than said first plurality, each of said digital computers having a stored program, and each of said digital computers located at a conferee, whereby distributed computer supervisory control of said telephonic conferencing is provided, b) providing SS7 compatible dial up telephone instruments to each of said conferees, said telephone instruments being components of a SS7 compatible telephone network, c) inputting digital information from said digital computers via said Internet network to a switch module capable of receiving and transmitting digital information, said switch adapted to dial up said telephone instruments in response to said digital information, whereby said conferees are connected to said telephone network to effect said conferencing, and d) programming said digital computers to exchange status information with said switch module, said status information including ringing, off hook, on hook busy, and dropped connection conditions at said conferees' locations for display at said digital computers.

7. The method of claim 6 further including the step of programming said digital computers to instruct said switch module to modify the protocol controlling participation of said conferees in said conferencing.

8. A communication system comprising:

a) communication SS7 compatible telephone network comprising a first plurality of communication units having assigned addressable designations, said communication units activated by dial up of said assigned addressable designations, b) SS7 switching module for effecting said dial up wherein selected ones of said communication units are mutually interconnected under control of said switching module, said switching module responsive to digital signals to effect said dial up, c) Internet digital channel for transmission and reception of said digital signals to and from said switching module, d) a second plurality of digital computers, wherein said second plurality is equal to or less than said first plurality, each digital computer located proximate to one of said communication units wherein said digital computers include stored programs that generate said digital signals, whereby distributed computer supervisory control of the interconnection of said communication units is provided, e) a plurality of display units, each one of said display units connected to one of said digital computers, including a tabular array comprising said assigned addressable designations exhibited on said display units, f) selector unit controlled by each of said digital computers for selecting at least one of said assigned addressable designations from said tabular array to provide at least one selected addressable designation, wherein transmission of said digital signal onto said Internet channel by said digital computers is effected, and further wherein said digital signal activates said switching module to dial up said at least one of said communication units having said at least one selected addressable designation whereby signal connection between said communication units is established.

9. The system of claim 8 wherein said digital computer further comprises a computer program connecting said Internet channel and said communication network, whereby said digital signals may be transmitted to said Internet channel via said communication network.

10. The system of claim 9 wherein said digital computers are adapted to disconnect said digital computers from said communication network after said digital signals are transmitted to said Internet channel.

11. The system of claim 8 wherein said digital computers are PC compatible computers.

12. The system of claim 8 wherein said display units are cathode ray tube display units.

13. The system of claim 8 wherein said display units are LCD display units.

14. The system of claim 8 wherein said each of said display units further displays an icon, said icon under control of said digital computers wherein activation of said icon by said computers enables operation of said selector unit.

15. The system of claim 14 wherein said icon is configured in the form of an informational message.

16. The system of claim 15 wherein said message is an advertisement.

17. The system of claim 8 further comprising a recording unit for recording said addressable designations dialed up by said switching unit.

18. The system of claim 17 further comprising a blocking unit wherein said addressable designations recorded in said recording unit cannot be identified by standard telephone caller identification apparatus.

19. A method for establishing telephonic connections among a first plurality of telephone devices, comprising the steps of:

a) connecting a second plurality of digital computers, to the Internet network, each of said digital computers located proximate to one of said telephone devices, said second plurality equal to or less than said first plurality, each of said computers containing a stored program whereby distributed computer supervisory control of said telephone devices is provided.

b) providing dial up capability to each of said telephone devices, said telephone devices being components of a SS7 compatible dial up telephone network, c) inputting digital information from said digital computers via said Internet network to a switch module capable of receiving and transmitting digital information, said switch module further adapted to dial up said at least one of said telephone devices in response to said digital information, d) providing a plurality of display units, each of said display units connected to one of said digital computers, e) displaying a tabulated group of assigned telephone addresses on each of said display units, f) selecting by said computers at least one of said assigned telephone addresses, to provide at least one selected telephone address, g) transmitting said at least one selected telephone address via said Internet network to said switch module whereby the telephone device having said at least one selected telephone address is activated by said switch.

20. The method of claim 19 including the step of displaying an icon under control of said digital computers on said display units.

21. The method of claim 20 including the step of enabling said icon to activate said digital computers for selecting at least one of said assigned telephone addresses.

22. The method of claim 20 including the step of displaying said icon in the form of an informational message.

23. The method of claim 20 including displaying said icon in the form of an advertisement.

24. The method of claim 19 including the step of recording each of said assigned telephone addresses when activating said switch.

25. The method of claim 19 including the step of blocking said assigned telephone addresses from determination by telephonic number identification devices.

* * * * *